US012625753B2

(12) United States Patent
Sethi et al.

(10) Patent No.: US 12,625,753 B2
(45) Date of Patent: May 12, 2026

(54) HARDWARE MANAGEMENT BASED ON FAILURE PREDICTION IN A MULTI-TIERED ARCHITECTURE

(71) Applicant: Dell Products L.P., Round Rock, TX (US)

(72) Inventors: Parminder Singh Sethi, Ludhiana (IN); Anay Kishore, Bangalore (IN); Praveen Kumar, Noida (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/757,007

(22) Filed: Jun. 27, 2024

(65) Prior Publication Data

US 2026/0003703 A1     Jan. 1, 2026

(51) Int. Cl.
| | |
|---|---|
| *G06F 11/00* | (2006.01) |
| *G06F 11/07* | (2006.01) |
| *G06F 11/34* | (2006.01) |

(52) U.S. Cl.
CPC ...... *G06F 11/0709* (2013.01); *G06F 11/0751* (2013.01); *G06F 11/3452* (2013.01)

(58) Field of Classification Search
CPC ............. G06F 11/0709; G06F 11/0751; G06F 11/3452
See application file for complete search history.

(56) References Cited

U.S. PATENT DOCUMENTS

| | | | | |
|---|---|---|---|---|
| 2015/0067411 A1* | 3/2015 | Xia | .................... | G06F 11/2257 |
| | | | | 714/47.3 |
| 2020/0379454 A1* | 12/2020 | Trinh | ................... | G05B 23/024 |
| 2021/0241151 A1* | 8/2021 | Sethi | ................... | G06F 11/3409 |
| 2021/0318921 A1* | 10/2021 | Higa | ................... | G06F 11/008 |
| 2021/0365762 A1* | 11/2021 | Rafey | ................... | G16Y 40/10 |
| 2024/0146617 A1* | 5/2024 | Anthuvan | ........... | H04L 43/0817 |
| 2024/0152442 A1* | 5/2024 | Sethi | ................... | G06F 11/0793 |

(Continued)

OTHER PUBLICATIONS

Progress Software Corporation, "SNMP Trap Receiver," https://www.whatsupgold.com/snmp/snmp-trap-receiver, Accessed Oct. 14, 2023, 2 pages.

(Continued)

*Primary Examiner* — Elmira Mehrmanesh
(74) *Attorney, Agent, or Firm* — Ryan, Mason & Lewis, LLP

(57) ABSTRACT
Techniques are disclosed for hardware management in an information processing system. For example, a method obtains, at an edge platform, one or more failure prediction values for one or more device types of the edge platform, wherein a failure prediction value for a device type represents a likelihood of failure associated with the device type. The method, at the edge platform, computes one or more health indicator values for the one or more device types based on the one or more failure prediction values, computes one or more behavior indicator values for the one or more device types based on the one or more health indicator values. The method causes, in response to the one or more behavior indicator values for the one or more device types, determination of one or more proactive actions to be initiated prior to a failure of one or more devices of the edge platform.

20 Claims, 9 Drawing Sheets

(56) References Cited

U.S. PATENT DOCUMENTS

2024/0305535 A1* 9/2024 White ................ H04L 41/5025

OTHER PUBLICATIONS

M. Rouse, "Hop," https://www.techopedia.com/definition/2411/hop, Apr. 23, 2018, 9 pages.
Phoenix Nap, "What is a Web Client?" https://phoenixnap.com/glossary/web-client#:~:text=A, Accessed Oct. 5, 2023, 2 pages.
Strong DM, "Forward Proxy vs. Reverse Proxy: The Difference Explained," https://www.strongdm.com/blog/difference-between-proxy-and-reverse-proxy, Accessed Oct. 5, 2023, 15 pages.
K. Yasar et al., "Network Switch," https://www.techtarget.com/searchnetworking/definition/switch?Offer=abMeterCharCount_var3, Accessed Oct. 9, 2023, 8 pages.
Cloudfare, "What is a Network switch? Switch vs. Router," https://www.cloudflare.com/learning/network-layer/what-is-a-network-switch/, Accessed Oct. 9, 2023, 6 pages.

* cited by examiner

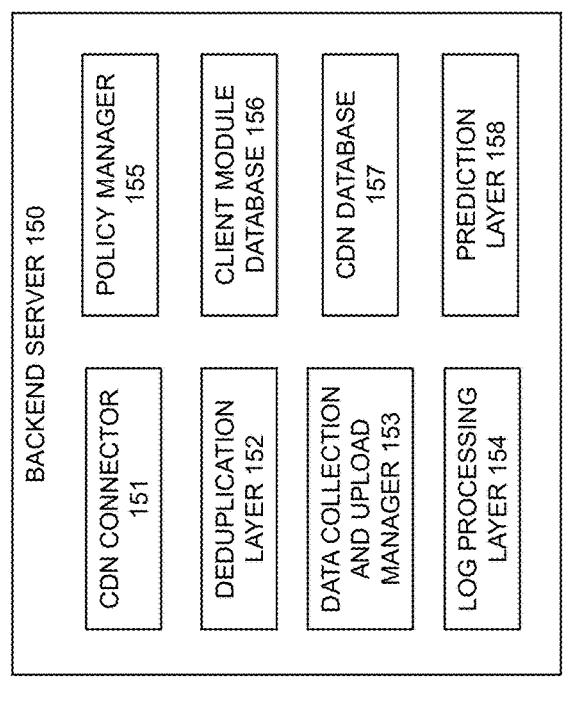

400

BACKEND SERVER 150

CDN CONNECTOR 151

POLICY MANAGER 155

DEDUPLICATION LAYER 152

CLIENT MODULE DATABASE 156

DATA COLLECTION AND UPLOAD MANAGER 153

CDN DATABASE 157

LOG PROCESSING LAYER 154

PREDICTION LAYER 158

CDN SERVER 140

REGISTRATION MANAGER 141

POLICY MANAGER 145

DEDUPLICATION LAYER 142

DATABASE 146

DATA COLLECTION AND UPLOAD MANAGER 143

CLIENT MODULE CONNECTOR 147

LOG PROCESSING LAYER 144

BACKEND CONNECTOR 148

Figure 6:
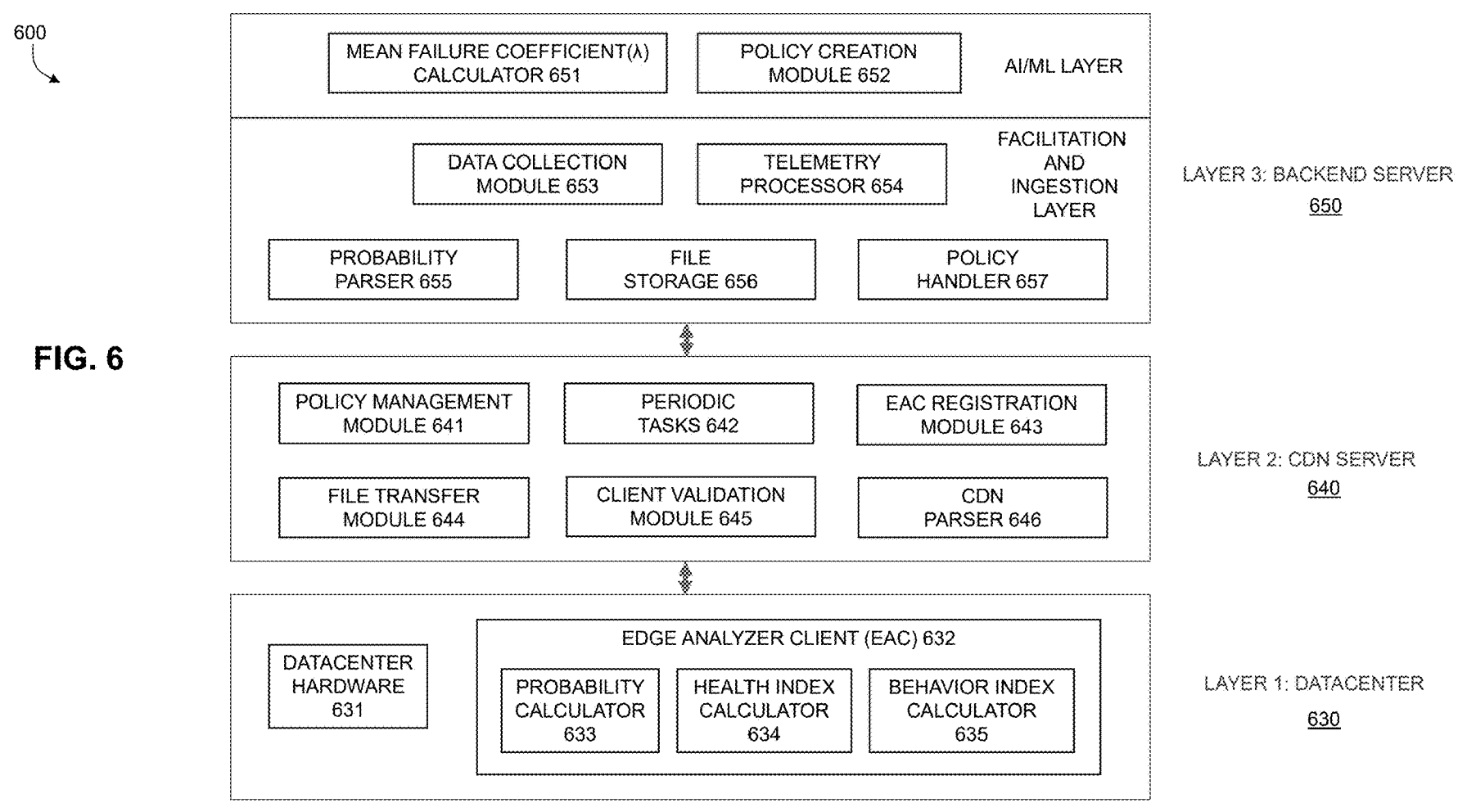

LAYER 3: BACKEND SERVER 650

LAYER 2: CDN SERVER 640

LAYER 1: DATACENTER 630

AI/ML LAYER

MEAN FAILURE COEFFICIENT(λ) CALCULATOR 651

POLICY CREATION MODULE 652

FACILITATION AND INGESTION LAYER

DATA COLLECTION MODULE 653

TELEMETRY PROCESSOR 654

PROBABILITY PARSER 655

FILE STORAGE 656

POLICY HANDLER 657

POLICY MANAGEMENT MODULE 641

PERIODIC TASKS 642

EAC REGISTRATION MODULE 643

FILE TRANSFER MODULE 644

CLIENT VALIDATION MODULE 645

CDN PARSER 646

EDGE ANALYZER CLIENT (EAC) 632

PROBABILITY CALCULATOR 633

HEALTH INDEX CALCULATOR 634

BEHAVIOR INDEX CALCULATOR 635

DATACENTER HARDWARE 631

600

HARDWARE MANAGEMENT BASED ON FAILURE PREDICTION IN A MULTI-TIERED ARCHITECTURE

FIELD

The field relates generally to information processing systems, and more particularly to management of hardware resources in such information processing systems.

BACKGROUND

In modern information processing systems, e.g., customer-based datacenters, there is a need to update and/or upgrade hardware resources. Such updates and upgrades typically involve a significant amount of planning and careful calculations of the existing resources with respect to demands and forecasts to arrive at an informed decision about deploying replacement and/or additional resources. This is a technical challenge particularly with respect to edge platforms.

SUMMARY

Embodiments provide techniques for hardware management in an information processing system.

For example, in one embodiment, a method obtains, at an edge platform, one or more failure prediction values for one or more device types of the edge platform, wherein a failure prediction value for a device type represents a likelihood of failure associated with the device type. The method computes, at the edge platform, one or more health indicator values for the one or more device types based on the one or more failure prediction values. The method computes, at the edge platform, one or more behavior indicator values for the one or more device types based on the one or more health indicator values. The method causes, in response to the one or more behavior indicator values for the one or more device types, determination of one or more proactive actions to be initiated prior to a failure of one or more devices of the edge platform.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 3 depicts components of a content delivery network server in an illustrative embodiment.

FIG. 4 depicts components of a backend server in an illustrative embodiment.

FIG. 6 depicts a multi-tiered architecture including hardware management functionalities in an illustrative embodiment.

DETAILED DESCRIPTION

Figure 1:
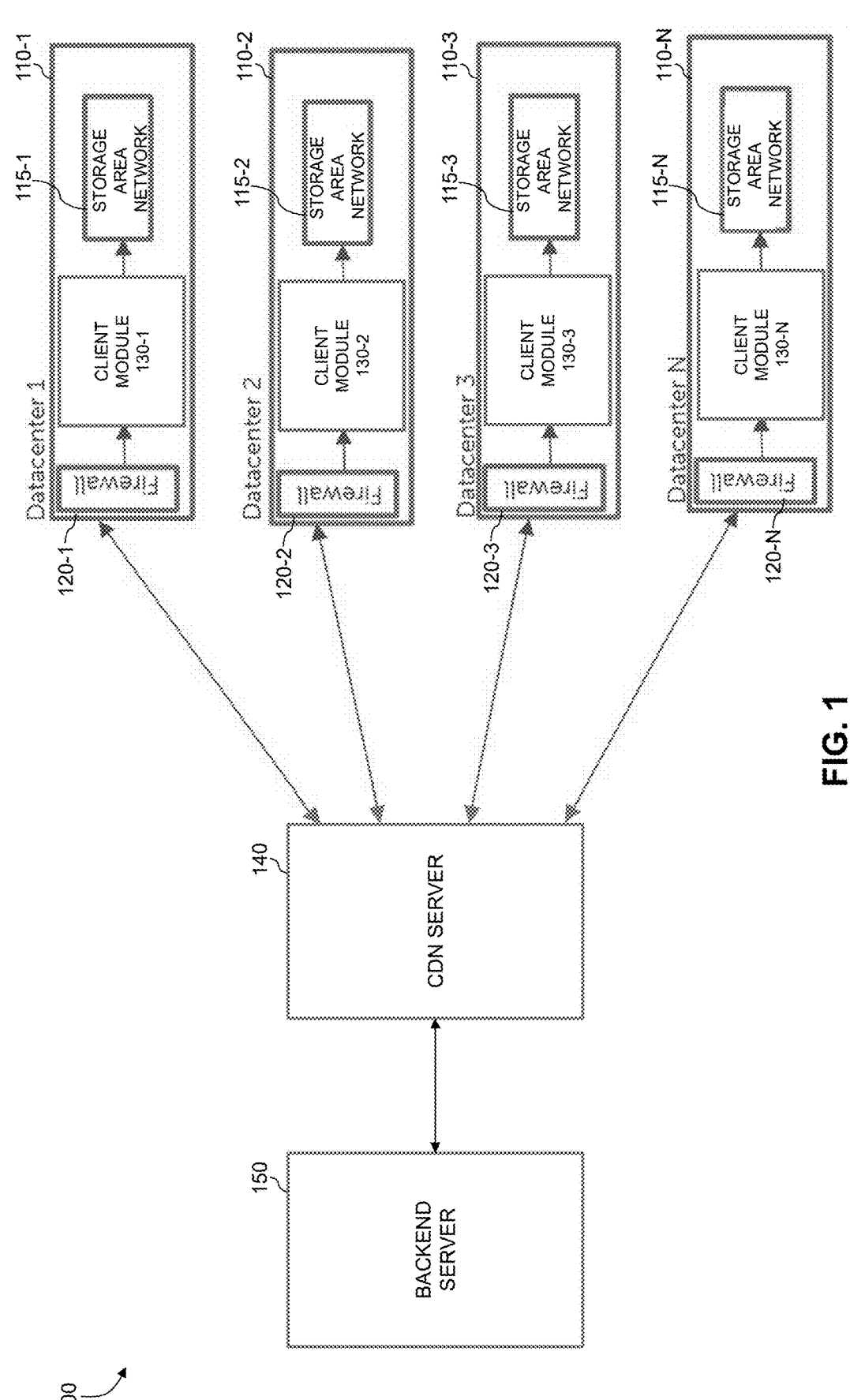
FIG. 1 depicts an information processing system with multiple edge datacenters and corresponding client modules connected to a backend server through a content delivery network server in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous, and a user device receives messages without any significant time delay. Of course, it should be understood that depending on the particular temporal nature of the system in which an embodiment is implemented, other appropriate timescales that provide at least contemporaneous performance and output can be achieved.

As used herein, "application programming interface (API)" or "interface" refers to a set of subroutine definitions, protocols, and/or tools for building software. Generally, an API defines communication between software components. APIs permit programmers to write software applications consistent with an operating environment or website. APIs are used to integrate and pass data between applications, and may be implemented on top of other systems.

FIG. 1 shows an information processing system 100 configured in accordance with an illustrative embodiment. The information processing system 100 comprises a plurality of datacenters 110-1, 110-2, 110-3, . . . , 110-N (collectively "datacenters 110") at respective edge locations. The datacenters 110 include respective storage area networks 115-1, 115-2, 115-3, . . . , 115-N (collectively "storage area networks 115"), respective firewalls 120-1, 120-2, 120-3, . . . , 120-N (collectively "firewalls 120") and respective client modules 130-1, 130-2, 130-3, . . . , 130-N (collectively "client modules 130"). The datacenters 110 are connected to a content delivery network (CDN) server 140, which is connected to a backend server 150.

Figure 2:
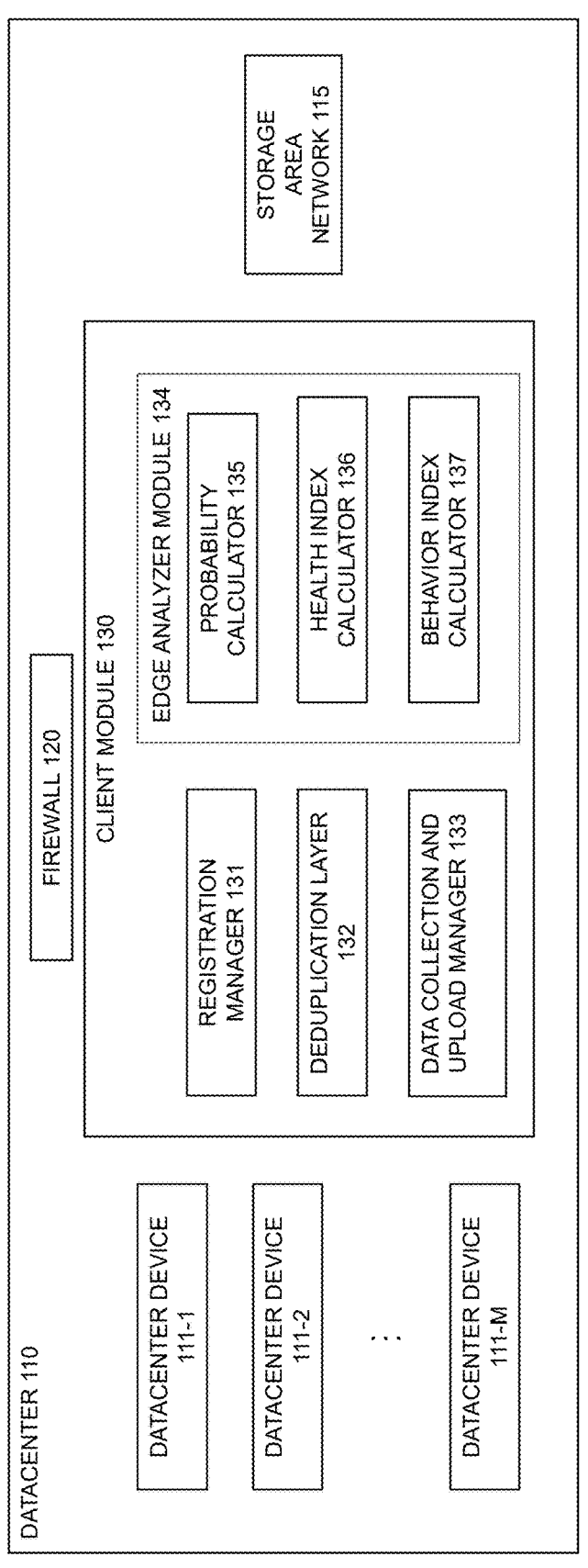
FIG. 2 depicts components of an edge datacenter and of a client module in an illustrative embodiment.

Referring to an architecture 200 in FIG. 2, each datacenter 110 further includes datacenter devices 111-1, 111-2, . . . 111-M (collectively "datacenter devices 111"). In addition, as explained in more detail herein, each client module 130 includes a registration manager 131, a deduplication layer 132, a data collection and upload manager 133, an edge analyzer module 134 including a probability calculator 135, a health index calculator 136, and a behavior index calculator 137. Referring to an architecture 300 in FIG. 3, as explained in more detail herein, the CDN server 140 includes a registration manager 141, a deduplication layer 142, a data collection and upload manager 143, a log processing layer 144, a policy manager 145, a database 146, a client module connector 147 and a backend connector 148. Referring to an architecture 400 in FIG. 4, as explained in more detail herein, the backend server 150 includes a CDN connector 151, a deduplication layer 152, a data collection and upload manager 153, a log processing layer 154, a policy manager 155, a client module database 156, a CDN database 157 and a prediction layer 158. The variables M and N and other similar index variables herein such as K and L are assumed to be arbitrary positive integers greater than or equal to one.

The datacenters 110 communicate over a network with CDN server 140 and the CDN server 140 communicates over the network with the backend server 150. The datacenter devices 111 can comprise, for example, Internet of Things (IoT) devices, desktop, laptop or tablet computers, mobile telephones, or other types of processing devices. Similarly, the CDN server 140 and backend server 150 can comprise, for example, desktop, laptop or tablet computers or other types of processing devices Such devices are examples of what are more generally referred to herein as "processing devices." Some of these processing devices are also generally referred to herein as "computers." The datacenter devices 111, CDN server 140 and backend server 150 may also or alternately comprise virtualized computing resources, such as virtual machines (VMs), containers, etc. The datacenter devices 111, CDN server 140 and backend server 150 in some embodiments comprise respective computers associated with a particular company, organization or other enterprise.

The terms "user" or "client" herein are intended to be broadly construed so as to encompass numerous arrangements of human, hardware, software or firmware entities, as well as combinations of such entities. Operational data monitoring, collection and deduplication services may be provided for users utilizing one or more machine learning models, although it is to be appreciated that other types of infrastructure arrangements could be used. At least a portion of the available services and functionalities provided by the datacenter 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the datacenters 110, CDN server 140 and backend server 150, as well as to support communication between the datacenters 110, CDN server 140 and backend server 150 and connected devices and/or other related systems and devices not explicitly shown.

An edge computing architecture moves at least a portion of data processing to the periphery of a network to be closer to a data source rather than to a centralized location. In illustrative embodiments, the datacenters 110 are edge datacenters. An edge datacenter is located at an edge computing site. An edge computing site may comprise one or more edge stations or other types and arrangements of edge nodes. An edge computing site illustratively comprises a plurality of edge devices (e.g., datacenter devices 111, devices which are part of the storage area networks 115, and devices on which the client modules 130 run). Each such node of an edge computing site comprises at least one processing device that includes a processor coupled to a memory. An edge computing site illustratively executes at least portions of various workloads for system users. Such workloads may comprise one or more applications. An example edge computing site comprises a set of edge compute, storage and/or network resources. A given such set of edge resources illustratively comprises at least one of compute, storage and network resources of one or more edge devices of the corresponding edge computing site.

Edge compute resources of the edge computing site can include, for example, various arrangements of processors, possibly including associated accelerators. Edge storage resources of the edge computing site (e.g., storage area networks 115) can include, for example, one or more storage systems or portions thereof that are part of or otherwise associated with the edge computing site. A given such storage system may comprise, for example, all-flash and hybrid flash storage arrays, software-defined storage systems, cloud storage systems, object-based storage systems, and scale-out distributed storage clusters. Combinations of multiple ones of these and other storage types can also be used in implementing a given storage system in an illustrative embodiment. Edge network resources of the edge computing site can include, for example, resources of various types of network interface devices providing particular bandwidth, data rate and communication protocol features.

If there are certain issues occurring with hardware and/or software in an edge datacenter that is hosting a critical application and the issues are not monitored and/or go unchecked, this may lead to unavailability of the hardware and/or software and failure of the application to provide its corresponding services. With the number of edge datacenters and hosting platforms increasing worldwide, it is becoming increasingly difficult for enterprises to track operation of and support the datacenter devices. For example, depending on their location, the datacenters can have different types of devices and different policies and standards for operation. Additionally, there are technical problems with collection, transmission and analysis of operational data of datacenter devices from thousands of locations worldwide and/or millions of datacenter devices that may have unique operational requirements.

For example, to support datacenters of different scales, vendor support systems need to be aligned with customer information technology (IT) needs, especially when a customer has datacenters with large numbers of devices, services and applications that increase the complexity of support processes. Support processes illustratively may include monitoring of datacenter devices and services for failure alerts and threats, taking periodic inventory of devices and applications, periodic, on-demand and/or alert-driven collection of operational data, transmission of operational data to vendors for analysis, creating and updating policies and definitions for alerts or other technical support issues, automated and manual support case creation and dispatching of replacement parts, and uploading and downloading of support logs, support application builds and snapshots.

As noted herein above, the different processes related to vendor support utilize large amounts of customer processing and network bandwidth and resources when transmitting device data between datacenters and backend locations for diagnosis and remediation of issues. In an attempt to address the above technical problems, the illustrative embodiments advantageously provide improvements in the configuration of support systems without compromising the quality of support transactions. In more detail, the illustrative embodiments provide a hardware management framework that predicts health and behavior attributes associated with datacenter devices 111 or other hardware, and computes health and behavior indexes that provide insight and triggers (automated and otherwise) for vendor support systems and/or other remedial functionalities of information processing system 100. The multi-tiered framework includes the client modules 130 in the datacenters 110 configured to provide a hardware management solution in an edge location for edge devices. The multi-tiered framework further includes CDN servers (e.g., CDN server 140) that are locally available to the datacenters 110 as an initial point of contact and backend servers (e.g., backend server 150) to process support requests received via the CDN servers.

As an additional advantage, the multi-tiered framework includes federated deduplication logic present in the client modules 130 and CDN servers to perform deduplication operations at different levels in order to decrease the overall communication footprint of the support processes. As a result, the amount of bandwidth and compute resources required for performance of such processes is greatly reduced when compared with conventional approaches.

Referring back to FIG. 1, the datacenters 110 communicate over a network with the CDN server 140 and the CDN server 140 communicates over the network with the backend server 150. The network is assumed to comprise a portion of a global computer network such as the Internet, although other types of networks can be part of the network, including a wide area network (WAN), a local area network (LAN), a satellite network, a telephone or cable network, a cellular network, a wireless network such as a WiFi or WiMAX network, or various portions or combinations of these and other types of networks. The network in some embodiments therefore comprises combinations of multiple different types of networks each comprising processing devices configured to communicate using Internet Protocol (IP) or other related communication protocols. The networks may comprise Internet Protocol version 6 (IPv6) and Internet Protocol version 4 (IPv4) configured networks. As explained in more detail herein, client modules are configured to be generic with respect to IP protocol to work with IPv4 and IPv6. For example, client modules can process the operational data of the edge device and perform other functions regardless of whether applications are ported from IPv4 to IPv6 or vice-versa.

Some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIGS. 1 and 2, a given one of the datacenters 110 includes datacenter devices 111, a storage area network 115, a firewall 120 and a client module 130. The client module 130 is connected between the firewall 120 and the remaining components of the datacenter 110. The firewall 120 provides a level of network security for the datacenter 110 to and from an external network by monitoring incoming and outgoing network traffic. The firewall 120 determines whether to allow or block specific traffic based on a defined set of security rules. The firewall 120 functions as a barrier between trusted, secured and controlled internal networks and untrusted outside networks. The firewall 120 can comprise, for example, hardware and/or software.

The storage area network 115 comprises software configured to provide high-speed shared storage for elements (e.g., datacenter devices 111, client module 130, etc.) of the datacenter 110. The storage area network 115 further comprises one or more storage devices. The storage devices comprise one or more of various types of storage devices such as hard-disk drives (HDDs), solid-state drives (SSDs), flash memory cards, or other types of non-volatile memory (NVM) devices including, but not limited to, non-volatile random-access memory (NVRAM), phase-change RAM (PC-RAM), magnetic RAM (MRAM), etc. In some embodiments, the storage devices comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices may be implemented in the storage area network 115. In this regard, the term "storage device" as used herein should be broadly construed to encompass all types of persistent storage media including hybrid drives.

Referring to FIGS. 1 and 2, the client module 130 comprises a registration manager 131, a deduplication layer 132, a data collection and upload manager 133, and an edge analyzer module 134 including a probability calculator 135, a health index calculator 136, and a behavior index calculator 137. The client module 130 is located in the datacenter 110 and works as an edge computing client sitting near the datacenter devices 111 where applications are deployed. As explained in more detail in connection with the information processing system 500 in FIG. 5, clusters of client modules (e.g., client modules 530) are connected with respective CDN servers (e.g., CDN servers 540-1, 540-2 and 540-3 (collectively "CDN servers 540"), which will be deployed on a zone basis based on the volume of required support. A client module 130/530 monitors the devices and components of its corresponding datacenter 110 (e.g., the datacenter devices 111 and devices of the storage area network 115 and/or components thereof) for failures, alerts and/or errors. Based on defined policies, the client modules 130/530 process the failures, alerts and/or errors. In illustrative embodiments, the client modules 130/530 perform alert-driven, on-demand and/or periodic collection of logs and operational data collection and, using the data collection and upload manager 133, upload at least a portion of the collected data to a CDN server 140/540. Prior to uploading, the deduplication layer 132 performs a first level of deduplication on the collected data. As will be further described, edge analyzer module 134 alternative to or in addition to the collected data uploading, determines various indices associated with hardware resources (e.g., the datacenter devices 111 and devices of the storage area network 115 and/or components thereof) of the datacenter 110 that can be used for update and/or upgrade decisions regarding such hardware resources.

In illustrative embodiments, a client module 130/530 runs on a standalone system with an operating system (OS) platform based on application packaging. A registration manager 131 registers a client module 130/530 with a CDN server 140/540. For example, based on a location of the client module 130/530 and a CDN server 140/540, the client module 130/530 identifies a CDN server 140/540 that is in proximity to (e.g., within a same area or region) as the client module 130/530. In other words, the client module 130/530 identifies the edge platform where the client module 130/530 is located as corresponding to a CDN server 140/540 based at least in part on the location of the edge platform with respect to the location of the CDN server 140/540. The registration manager 131 may analyze location settings of the client module 130/530 and of the CDN server 140/540 to identify a local CDN server. Registration data can be built-in to the client modules 130/530. Once registered with a CDN server 140/540, a client module 130/530 is enabled to perform support process operations. For example, a client module 130/530 will have an inventory of devices and applications within a datacenter 110 and will monitor the devices and applications for alerts based on designated policies.

In illustrative embodiments, the client modules 130/530 store collected operational data from datacenter devices 111 or other components of a datacenter 110 in a corresponding storage area network 115 of the datacenter 110. The deduplication layer 132 performs a first deduplication process on the collected data prior to data transmission to a CDN server 140/540. For example, the first deduplication process comprises determining whether transmission of the data to the CDN server 140/540 will be a first transmission of the data to the CDN server 140/540. If the transmission of the data to the CDN server 140/540 will be a first transmission of the data, the deduplication layer 132 generates one or more identifiers for the data to be transmitted to the CDN server 140/540 with the original data. In illustrative embodiments, an identifier comprises a unique identifier (e.g., universally unique identifier (UUID)) that is unique to a particular portion (e.g., chunk) of the data and occupies less memory than the original data. In some embodiments, the identifier comprises a hash value or other type of shortened value representing the particular portion of the data. The hash value may be created by the deduplication layer 132 using one or more hash functions such as, but not necessarily limited to, a cryptographic hash function which takes an input (or "message") and returns a fixed-size alphanumeric string, which is called the hash value (also a message digest, a digital fingerprint, a digest, or a checksum).

The client module 130 stores the identifiers and a mapping of the respective identifiers to their corresponding data portions in, for example, a corresponding storage area network 115. Similarly, upon receiving the identifiers with a first transmission of the data, the CDN server 140/540 maps the respective identifiers to their corresponding data portions. The CDN server 140/540 stores the identifiers and the mapping of the respective identifiers to their corresponding data portions in, for example, a corresponding database 146.

For subsequent transmissions of data after a first transmission of the data to a CDN server 140/540, the client module 130/530 sends only the identifiers corresponding to the data portions that are to be transmitted to the CDN server 140/540, and not the data itself. In other words, if data has been designated for re-transmission to a CDN server 140/540 after being previously sent to the CDN server 140/540 from a client module 130/530, the client module 130/530, via data collection and upload manager 133 and firewall 120, uploads and transmits the identifiers in place of the data that has been previously sent to the CDN server 140/540. In this case, upon receipt of the identifiers, the CDN servers 140/540 use the stored identifiers and mapping to identify the data portions corresponding to the identifiers. Based on this first level of deduplication, by transmitting only the identifiers in subsequent transmissions, the volume of data being sent from the client modules 130/530 to the CDN servers 140/540 is greatly reduced.

Figure 5:
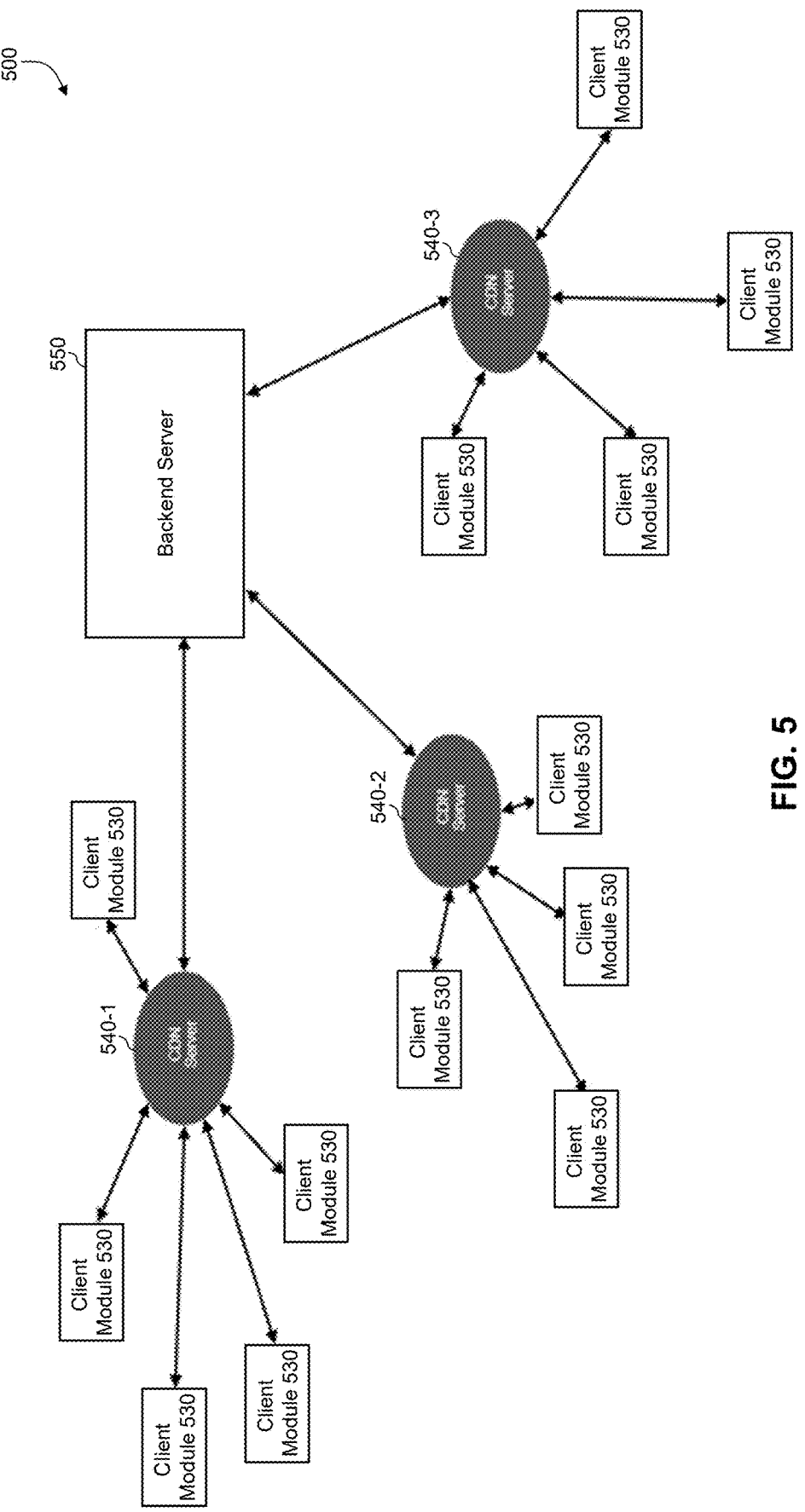
FIG. 5 depicts an architecture including multiple edge client modules connected to a backend server through respective content delivery network servers in an illustrative embodiment.

As the number of datacenters 110, datacenter devices 111 and applications being monitored can be very high as discussed hereinabove, supporting monitoring of all the devices, services and/or applications from a centralized backend server alone is problematic. Referring to FIG. 5, multiple client modules 530 are respectively connected to CDN servers 540-1, 540-2 and 540-3. The CDN servers 540 are connected to backend server 550. The CDN servers 540 are configured the same as or similar to the CDN server 140. The backend server 550 is configured the same as or similar to the backend server 150. The CDN servers 140/540 provide local support for client modules 130/530 and are deployed on a zone level (e.g., continent/region/area based). As the number of clients can be high, it will take large amounts of processing time for all client modules 130/530 to directly communicate with a backend server 150/550. To avoid this, intermediate CDN servers 140/540 are deployed at a reachable limit for faster access to services by the client modules 130/530. Data monitoring, collection and transmission policies generated by the backend servers 150/550 can be stored at the local CDN servers 140/540 in, for example, a corresponding database 146. Different types of operational data (e.g., performance metrics, alerts or notifications of device or component errors or other issues, logs and/or sensor data), can be uploaded from the client modules 130/530 to the CDN servers 140/540, and will further be uploaded to the backend server 150/550 for additional processing and generation of enhanced definitions, policies and and/or rules for data monitoring, collection and transmission. The backend servers 150/550 will be located at a backend (e.g., of an enterprise) and function as a central service provider for all of the CDN servers 140/540. The backend servers 150/550 obtain data as uploads from the CDN servers 140/540 and process the data.

An example CDN server 140 (or 540) includes the registration manager 141, the deduplication layer 142, the data collection and upload manager 143, the log processing layer 144, the policy manager 145, the database 146, the client module connector 147 and the backend connector 148. The registration manager 141 provides registration support to all the client modules 130/530 in proximity to the CDN server 140/540 (e.g., in a designated region, zone or area near the CDN server 140/540). The registration manager 141 sends the details of each registration to the backend server 150/550.

The data collection and upload manager 143 and log processing layer 144 receive and process the different types of operational data (e.g., performance metrics, alerts or notifications of device or component errors or other issues, logs and/or sensor data, health and behavior indices, etc.) from the client modules 130/530 via the client module connector 147. The client module connector 147 implements one or more APIs to interface with a client module 130/530. The received different types of operational data can further be uploaded to the backend server 150/550 for additional processing. Similar to the deduplication layer 132, the deduplication layer 142 of a CDN server 140/540 performs a second deduplication process on the collected data prior to data transmission to a backend server 150/550. For example, the second deduplication process comprises determining whether transmission of data from the CDN server 140/540 to the backend server 150/550 will be a first transmission of the data to the backend server 150/550. If the transmission of the data to the backend server 150/550 will be a first transmission of the data to the backend server 150/550, the deduplication layer 142 generates one or more identifiers for the data to be transmitted to the backend server 150/550 with the original data. In illustrative embodiments, similar to the identifiers generated by the client module 130/530, an identifier generated by the CDN server 140/540 comprises a unique identifier (e.g. UUID), a hash value or other type of shortened value occupying less memory than the original data and which is unique to a particular portion (e.g., chunk) of the data.

The CDN server 140/540 stores the identifiers and a mapping of the respective identifiers to their corresponding data portions in, for example, a corresponding database 146. Similarly, upon receiving the identifiers with a first transmission of the data, the backend server 150/550 maps the respective identifiers to their corresponding data portions. The backend server 150/550 stores the identifiers and the mapping of the respective identifiers to their corresponding data portions in, for example, a corresponding client module database 156 or CDN database 157.

For subsequent transmissions of data after a first transmission of the data to a backend server 150/550, the CDN server 140/540 sends only the identifiers corresponding to the data portions that are to be transmitted to the backend server 150/550, and not the data itself. In other words, if data has been designated for re-transmission to a backend server 150/550 after being previously sent to the backend server 150/550 from a CDN server 140/540, the CDN server 140/540, via data collection and upload manager 143 and backend connector 148, uploads and transmits the identifiers in place of the data that has been previously sent to the backend server 150/550. In this case, upon receipt of the identifiers, the backend server 150/550 uses the stored identifiers and mapping to identify the data portions corresponding to the identifiers. Based on this second level of deduplication, by transmitting only the identifiers in subsequent transmissions, the volume of data being sent from the CDN servers 140/540 to the backend server 150/550 is greatly reduced. The backend connector 148 implements one or more APIs to interface with the backend server 150/550.

As the CDN servers 140/540 will receive data from several client modules 130/530, the deduplication layers 142 of the CDN servers 140/540 are configured to create identifiers corresponding to larger portions (e.g., chunks) of data than the identifiers created by the deduplication layers 132 of the client modules 130/530.

In accordance with illustrative embodiments, the backend server 150/550 monitors support activities globally, where such monitoring is facilitated by the CDN servers 140/540. An example backend server 150 (or 550) includes the CDN connector 151, deduplication layer 152, data collection and upload manager 153, log processing layer 154, policy manager 155, client module database 156, CDN database 157 and prediction layer 158. The backend server 150/550, via the CDN connector 151, data collection and upload manager 153 and log processing layer 154, receives and processes the different types of operational data (e.g., performance metrics, alerts or notifications of device or component errors or other issues, logs and/or sensor data, health and behavior indices, etc.) from the CDN servers 140/540. The CDN connector 151 implements one or more APIs to interface with a CDN server 140/540. As explained herein above, the CDN servers 140/540 are geographically distributed. The client module database 156 and the CDN database 157 respectively maintain details of the client modules 130/530 and the CDN servers 140/540.

Upon receiving identifiers with a first transmission of data from a CDN server 140/540, the deduplication layer 152 of the backend server 150/550 maps the respective identifiers to their corresponding data portions. As noted hereinabove, the backend server 150/550 stores the identifiers and mapping of the respective identifiers to their corresponding data portions in, for example, a corresponding client module database 156 or CDN database 157. For the subsequent transmissions of data after a first transmission of the data to the backend server 150/550, upon receipt of the identifiers, the deduplication layer 152 of the backend server 150/550 uses the stored identifiers and mapping to identify the data portions corresponding to the identifiers.

The prediction layer 158 performs predictive analysis on the data. For example, the prediction layer generates predictions regarding device issues using machine learning and generates automated remedial actions based on the predictions to eliminate downtime before it occurs. According to illustrative embodiments, the collected operational data relates to the health of the datacenter devices 111, the health of storage devices and/or components (e.g., devices of the storage area networks 115) and the health of networking devices (e.g., network switches). The collected operational data may indicate changes in performance metrics (e.g., decreases in input-output operations per second (IOPS) and throughput, increases in latency, etc.). The operational data further includes, but is not necessarily limited to, server OpenManage (OM) logs, operating system (OS) utilization data, server integrated Dell® remote access controller (iDRAC) logs, server hardware configuration data, OS event logs, PowerEdge™ RAID Controller (PERC TTY) logs, debug logs, application data and storage logs. The collected data can include live and historical data, which includes, for example, system information, storage logs, OS and application data, basic input-output system (BIOS) serial logs and debug logs. The BIOS serial logs can be collected using secure shell (SSH) protocol.

Reasons for device or component failure may be detectable by the machine learning algorithms of the prediction layer 158 of the backend server 150/550. The results of the machine learning analysis of the operational data by the prediction layer 158 of the backend server 150/550 are used by the policy manager 155 to generate updated policies for processing of collected operational data by the CDN servers 140/540 and/or client modules 130/530. The CDN servers 140/540 and/or client modules 130/530 will have a defined set of policies to process error or failure alerts from datacenter devices 111 and/or components. These policies will be generated by the policy manager 155 at the backend server 150/550 and passed through the policy managers 145 of the CDN servers 140/540. The policies will be updated at different times based on updated machine learning by the backend server 150/550.

For example, the backend server 150/550 uses one or more machine learning algorithms to analyze data corresponding to the operation of the one or more datacenter devices 111 and based at least in part on the analysis, predicts one or more issues with the one or more devices. The backend server 150/550 generates one or more policies regarding processing of the data corresponding to the operation of one or more datacenter devices 111 based at least in part on the one or more issues. The client modules 130/530 receive, via a corresponding CDN server 140/540, the one or more policies from the backend server 150/550, and process data corresponding to the operation of the one or more devices according to the one or more policies.

According to illustrative embodiments, a client module 130/530 is installed within the datacenter 110 with administrator and/or root access. The CDN servers 140/540 are points of contact for the client modules 130/530 between the client modules 130/530 and the backend server 150/550. The CDN servers 140/540 can be configured according to local/regional requirements for datacenters 110 similarly located. In illustrative embodiments, the policy managers 145 of the CDN servers 140/540 are configured to store zone/region level policies for different device types. For example, the service level agreement (SLA) for similar warranty levels and/or parts replacement policies might be different in different regions. The CDN servers 140/540 are further configured to collect monitoring and alert processing policies from the backend server 150/550 and forward the monitoring and alert policies to the client modules 130/530 periodically or at designated times. As a backend server 150/550 may process a large number of policies, the CDN servers 140/540 are configured to filter policies with regional level support requirements. For example, some device models may not be released in all regions and/or the threshold for support cases and/or parts replacements may be different for different regions.

In illustrative embodiments, the backend server 150/550 runs machine learning analysis to generate predictions to identify failures, unavailability or other issues with the datacenter devices 111 and/or components, generates policies and/or rules for processing (e.g., monitoring, collecting and transmitting) operational data of the datacenter devices 111 and/or components based on the machine learning analysis and passing the policies and/or rules to the client modules 130/530 (via CDN servers 140/540) to improve data collection and prevent device unavailability In illustrative embodiments, the client modules 130/530 further comprise an onboard graphics processing unit (GPU) (not shown) to which datacenter monitoring related tasks can be offloaded. The onboard GPU can accommodate extra processing needs due to large amounts of operational data and monitoring efforts. The client modules 130/530 maintain an inventory of devices and components within a datacenter 110 and monitor the devices and components using different methods such as, but not necessarily limited to, simple network management protocol (SNMP) techniques, retrieval and analysis of sensor data from sensors associated with the devices and/or components and/or error logging (e.g., logging of alerts, notifications and/or errors generated by the devices and/or components), etc. In illustrative embodiments, sensors are part of the devices or components being monitored and may include, but are not necessarily limited to, temperature sensors, fan speed sensors or other sensors that might indicate hardware issues or problems. For example, temperature sensors may indicate temperatures above a designated threshold identifying issues with device operation causing unwanted heat generation.

According to one or more embodiments, storage devices of the storage area networks 115, database 146, client module database 156, CDN database 157 and other data repositories or databases referred to herein can be configured according to a relational database management system (RDBMS) (e.g., PostgreSQL). In some embodiments, the storage devices of the storage area networks 115, database 146, client module database 156, CDN database 157 and other data repositories or databases referred to herein are implemented using one or more storage systems or devices. In some embodiments, one or more of the storage systems utilized to implement the storage devices of the storage area networks 115, database 146, client module database 156, CDN database 157 and other data repositories or databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

The datacenter 110, client modules 130/530, CDN servers 140/540, backend servers 150/550 and one or more elements thereof in the embodiments described herein are each assumed to be implemented using at least one processing device. Each such processing device generally comprises at least one processor and an associated memory, and implements one or more functional modules for controlling certain features of the datacenter 110, client modules 130/530, CDN servers 140/540, backend servers 150/550 and one or more elements thereof.

At least portions of the datacenter 110, client modules 130/530, CDN servers 140/540, backend servers 150/550 and one or more elements thereof may be implemented at least in part in the form of software that is stored in memory and executed by a processor. The datacenter 110, client modules 130/530, CDN servers 140/540, backend servers 150/550 and one or more elements thereof comprise further hardware and software required for running the datacenter 110, including, but not necessarily limited to, on-premises or cloud-based centralized hardware, GPU hardware, virtualization infrastructure software and hardware, Docker containers, networking software and hardware, and cloud infrastructure software and hardware.

It is assumed that the datacenter 110, client modules 130/530, CDN servers 140/540, backend servers 150/550 and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the datacenter 110, client modules 130/530, CDN servers 140/540, backend servers 150/550 and one or more elements thereof can each be implemented in the form of one or more LXCs running on one or more VMs. Other arrangements of one or more processing devices of a processing platform can be used to implement the datacenter 110, client modules 130/530, CDN servers 140/540, backend servers 150/550 and one or more elements thereof. Other portions of the systems 100 and 500 can similarly be implemented using one or more processing devices of at least one processing platform.

It is to be appreciated that these and other features of illustrative embodiments are presented by way of example only, and should not be construed as limiting in any way. Accordingly, different numbers, types and arrangements of system elements such as the datacenter 110, client modules 130/530, CDN servers 140/540, backend servers 150/550 and one or more elements thereof can be used in other embodiments.

It should be understood that the particular sets of modules and other elements implemented in the systems 100 and 500 as illustrated in FIGS. 1 and 5 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the datacenter 110, client modules 130/530, CDN servers 140/540 and/or backend servers 150/550 can be offered to cloud infrastructure customers or other users as part of FaaS, CaaS and/or PaaS offerings.

It is realized that, in some embodiments, it may be desirable to upgrade or change hardware or related components such as may reside in a datacenter 110, e.g., one or more of datacenter devices 111, storage devices of storage area network 115, and/or other hardware resources or units as well as components thereof. In such use cases, it is desirable to understand the current ecosystem (e.g., information processing system 100) and its underlying architectural attributes which define the behavior of the hardware resources and the changes that they are supposed to undergo. Accordingly, illustrative embodiments calculate and assign indexed references to hardware resources or units (e.g., one or more of datacenter devices 111, storage devices of storage area network 115, and/or other hardware resources or units as well as components thereof), which provides relative data to analyze the probability of the success or the failure of the planned changes. In some embodiments, the hardware indexing is based on multiple factors related to past and present telemetry, hardware performance and the probability analysis of possible failure circumstances and occurrences.

To be able to achieve an improved (e.g., optimal, substantially optimal, etc.) output of changes or scaling of hardware, it is realized herein that there is a need to focus on multiple aspects of the current ecosystem (e.g., information processing system 100) and judge the potential that the ecosystem provides and its related shortcomings. In existing approaches, some of these aspects may typically be considered in a manual way. For example, current processing capabilities are considered by IT personnel and, based on manually estimated process output requirements, human decisions are made with respect to changes or upgrades in hardware and its related components. However, there is a potential that the current hardware and application/service stack is not performing at its desired level, and it may not be able do so even in an upgraded environment because of certain unidentified challenges. It could also be because of a lack of understanding of the possibility of inter-peripheral incompatibility and versions of firmware being used.

With the amount of hardware being significant in an ecosystem at times, it becomes much more complicated to manually make such decisions related to changes or upgrades of the hardware stack. Accordingly, understanding such challenges becomes important to be able to make an informed and quality decision on hardware changes and upgrades and for an ongoing qualitative approach towards achieving improved output with a higher predictability of hardware life.

One or more illustrative embodiments divide these considerations in multiple categories: (i) formulate a plan for efficient assessment of current hardware potential and challenges and derive hardware indices; (ii) track and derive analysis from the significant amount of hardware and determine a quality approach to refer related data for improved results; and (iii) learn from challenges and use such learning as feedback to improve the overall process of probability and predictions.

Referring now to FIG. 6, a multi-tiered architecture 600 including hardware management functionalities in an illustrative embodiment is shown. More particularly, multi-tiered architecture 600 includes a datacenter 630 (layer 1), a CDN server 640 (layer 2), and a backend server 650 (layer 3). Note that, in some illustrative embodiments, datacenter 630, CDN server 640, and backend server 650 respectively correspond to datacenters 110, CDN server 140, and backend server 150 in information processing system 100 of FIG. 1.

Datacenter 630 includes datacenter hardware 631 (e.g., one or more of datacenter devices 111, storage devices of storage area network 115, and/or other hardware resources or units as well as components thereof) and an edge analyzer client (EAC) 622 which includes a probability calculator 633, a health index calculator 634, and a behavior index calculator 635. Note that, in some embodiments, (EAC) 622 including probability calculator 633, health index calculator 634, and behavior index calculator 635 respectively correspond to edge analyzer module 134 including probability calculator 135, health index calculator 136, and behavior index calculator 137 in client module 130 of FIG. 1.

CDN server 640 includes a policy management module 641, periodic tasks 642, an EAC registration module 643, a file transfer module 644, a client validation module 645, and a CDN parser 646. Further, backend server 650 includes an artificial intelligence/machine learning (AI/ML) layer including a mean failure coefficient value (k) calculator 651 and a policy creation module 652, and a facilitation and ingestion layer including a data collection module 653, a telemetry processor 654, a probability parser 655, file storage 656, and a policy handler 657. It is to be appreciated that file transfer, data collection, telemetry, file storage, registration, task monitoring, client validation, policy handling and other functionalities provided by certain of the above-mentioned modules in CDN server 640 and backend server 650 have similar functionalities as those described above in the context of CDN server 140/540 and backend server 150/550, unless otherwise specified.

As will be further described, multi-tiered architecture 600 provides a proactive lightweight framework for formulating the hardware healthiness for any devices at the client side, e.g., datacenter 630 (without necessarily pushing data to backend server 650) by generating a set of probabilities throughout a device lifecycle using one or more probability distribution functions. In one or more illustrative embodiments, a Poisson distribution function is used as the probability distribution function. Moreover, multi-tiered architecture 600 provides a framework to calculate a behavior index for each device by predicting the hardware's realistic behavior and its stability with respect to the environment and health of peer devices. By way of example only, a given device may currently be performing in a minimally unhealthy manner, however, the device may be categorized in a group of devices that will fail relatively soon. Multi-tiered architecture 600 can, inter alia, advantageously predict such behavior.

More particularly, and as will be further described herein, EAC 632 is deployed in a customer datacenter, e.g., datacenter 630, and calculates the probabilities (e.g., probability calculator 633) of failures and derives a health index (e.g., health index calculator 634) and a behavior index (e.g., behavior index calculator 635) for each resource/unit of datacenter hardware 631. EAC 632 is also configured to monitor devices and applications for alerts/errors/failures based on defined policies and thus update the health and behavior indices of the devices. EAC 632 is also configured to maintain a periodic log and telemetry data and perform inventory collection for upload to backend server 650, through CDN server 640, for further analysis.

Further, as mentioned above, CDN server 640 includes CDN parser 646. CDN parsers, e.g., CDN parser 646, can be deployed in one of more CDN servers to support EAC functionalities, e.g., functionalities of EAC 632 in datacenter 630. In some embodiments, mean failure coefficient value (λ) calculated by backend server 650 for different hardware in datacenter hardware 631 and respective monitoring policies can be stored at CDN parsers, e.g., CDN parser 646, so as to be readily available for the EACs, e.g., EAC 632, to consume.

Backend server 650 supports the ecosystem of multi-tiered architecture 600, inter alia, by performing a predictive data analysis and passing information to CDN parsers, e.g., CDN parser 646, and to EACs, e.g., EAC 632, via CDN parsers. Backend server 650 derives failure co-efficient values (λ) for each different hardware resource based on, for example, threshold and frequency of occurrence of failures and errors, as will be further described.

Accordingly, in some embodiments, backend server 650 performs a predicative analysis on different families of devices and applications based on the historic data available (e.g., from data collection module 653, telemetry processor 654, file storage 656, etc.). Upon this calculation and learning, backend server 650 generates: (i) a mean failure coefficient value λ value for each type of hardware and application; and (ii) one or more policies based on a threshold and a frequency of occurrence of alerts to determine the degradation of the device health. The value of λ for different hardware and applications along with the one or more policies is stored in backend server 650 and CDN parser 646 of CDN server 640.

EAC 632 is installed at the customer location, e.g., datacenter 630, and performs the following tasks upon successful installation:

(i) Registers with the local CDN parser 646 (e.g., via EAC registration module 643) and establishes a secure connection.

(ii) Discovers the devices and applications at its corresponding datacenter 630 and download related λ values from CDN parser 646.

(iii) Performs a health index calculation (e.g., health index calculator 634) based on a Probability Mass Function (PMF) and Cumulative Distribution Function (CDF) via Poisson distribution.

(iv) Based on calculation of the health index, calculate and assign a behavior index (e.g., behavior index calculator 635) for all hardware and applications, and update them over a given time period upon monitoring based on one or more policies.

Note that, initially, the health index value can be assigned as the behavior index value. EAC 632 monitors several parameters (e.g., alerts, failures, performance, etc.) for the hardware and applications and updates the behavior index value over the give time period. This update can occur based on one or more policies provided by backend server 650 (e.g., policy creation module 652). The behavior index value of the same application/hardware may differ from environment to environment (e.g., different customer datacenters) based on the numbers of errors and failures that occur in each environment. In some embodiments, the higher the value of the behavior index for any individual component signifies a higher stability of the component. For example, the behavior index value can be inversely proportional to a failure probability value for a given hardware resource/unit.

Further, in some embodiments, the health index calculation can be done based on the probability of any issue or failure occurrences (e.g., computed by probability calculator 633). By way of example only, a customer can initially provide the Internet Protocol (IP) address ranges in which the device of the datacenter hardware 631 is operating, e.g., during the installation of EAC 632. Based on this information, a quick discovery and inventory task is performed to identify the types of applications and hardware available in the environment.

EAC 632 calls to CDN parser 646 and collects the value of the mean failure co-efficient (λ) for all the applications and hardware and store this information in a local application database. This value of λ is then used for finding the probability of failure via the Poisson distribution. The value of λ is passed as a deviation factor and the probability value is calculated for a Probability Mass Function (PMF) and a Cumulative Distribution Function (CMF), e.g., as respectively shown in FIGS. 7 and 8 as graphs 700 and 800.

Poisson distribution describes the number of events occurring in a fixed time interval or region of opportunity, and depends upon two factors: (i) the rate of occurrence of events; and (ii) the dependence/independence of events. In some embodiments, the rate with which the events occur is constant, and thus λ is a constant. Further, the occurrence of one event does not affect the occurrence of a subsequent event, which means events are independent. Thus, in some embodiments, the failure observed once on a hardware resource or application pair is not dependent on the failure occurring again on the resource, e.g., a failure can occur at any random time. Thus, Poisson distribution fits datacenter use cases in order to understand the healthiness of the devices. EAC 632 thus assigns a health index value based on the healthiness prediction, and the health index value for applications and different types of hardware is further used to understand the behavior of the hardware based on local datacenter parameters.

A PMF can be mathematically represented as:

$$P(X = x) = \frac{e^{-\lambda}\lambda^x}{x!}$$

Figures 7, 8, 9:
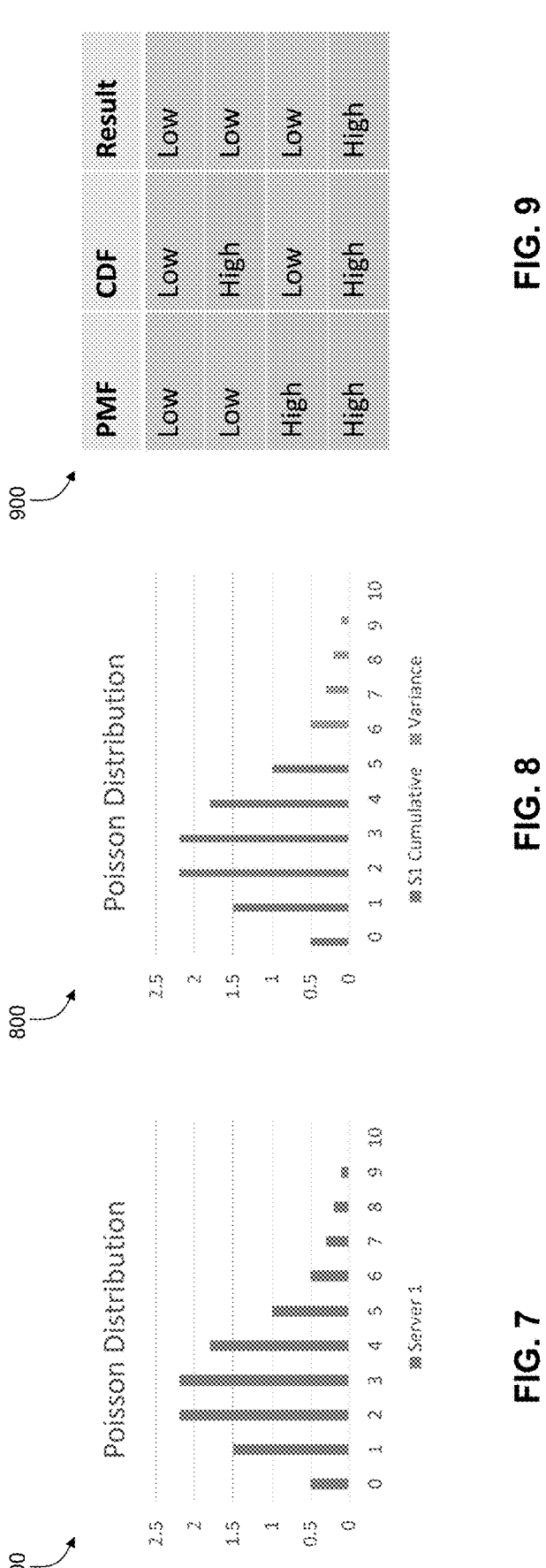
FIG. 7 depicts a probability mass function for use in hardware management in an illustrative embodiment.
FIG. 8 depicts a cumulative distribution function for use in hardware management in an illustrative embodiment.
FIG. 9 depicts health index calculation results for use in hardware management in an illustrative embodiment.

More particularly, a PMF describes the possibility of occurrence of an event at any given point of time, and uses discrete random variables rather than continuous random variables. As the failures in the hardware and application domain are dependent on the datacenter conditions and spikes in performance (e.g., due to business demands), etc., it is reasonable to assume the variables to be discrete random rather than continuous random. The value of PMF represents the possibility of failure of hardware at any given point of time. This value is further used to define the healthiness and thus the health index value of the hardware. Assume that the value of $\lambda$ for a server is three years and there is a need to calculate the probability of failure occurrence at two years. Using the above PMF, the probability will be 0.224. Graph 700 in FIG. 7 shows a Poisson distribution when the value of $\lambda$ is 3.

A CDF can be mathematically represented as:

$$P(X \le x) = \frac{\Gamma([x+1], \lambda)}{[x!]}$$

More particularly, a CDF describes the cumulative probability of the occurrence of an event from zero up to any given point of time. If there are random variables associated with an event, a CDF can be used to describe the occurrence probability distribution around the event. As the failures in the hardware and the application domain are dependent on the datacenter conditions and spikes in performance (e.g., due to business demands), etc., it is further reasonable to assume the variables to be in a random order and thus the CDF can describe the probability distribution.

The value of CDF can represent the possibility of failure of the hardware or the application up to or after any given point of time. Similar to PMF, this CDF value will also further be used to define the healthiness and health index of the hardware. Assume that the value of $\lambda$ for a server is three years and there is a need to calculate the probability of failure occurrence at five years. Using the above CDF, the cumulative probability will be 0.916. Graph 800 in FIG. 8 shows a Poisson distribution when the value of $\lambda$ is 3.

The health index is then calculated based on the values of the probabilities achieved from the PMF and CDF calculations. As these probability functions define the possibility of failure, the stability of a device can be derived. FIG. 9 depicts health index calculation results table 900 in a given example. In this example, the column "result" is a relative reliability value (e.g., high or low). If the value of PMF is less than 0.25, by way of example, this can be considered a high reliability with respect to the PMF. Similarly, if the value of CDF is less than 0.5, this can be considered a high reliability with respect to CDF. In some embodiments, an 'AND' operation is performed on these values and assigned as a health index to the hardware in terms of high and low reliability.

As mentioned, while initially the value of calculated health index is assigned to the behavior index, EAC 632 monitors several parameters of the hardware and updates the behavior index value over a given time period, e.g., occurrence of alerts and respective thresholds, performance benchmarks (e.g., CPU, memory, inputs/outputs, throughput, etc.) on each device, voltage and temperature data, failures for services and requests, virtual component disconnection, network glitches and outages, and triggers of services on fallback systems (disaster recovery). Based on analysis of different types of issues, distinct conclusions are derived. For example, the low or rare occurrence of alerts and failures means higher stability and healthiness (behavior index) of devices. Even if the health index is high, based on the issues and failures occurrences, it can be inferred that the chances of the device staying healthy is low. This means a decreased behavior index. Frequent occurrence of a particular type of failure may mean healthiness (behavior index) of related hardware will be low and other devices may still have a higher behavior index. Upon fixing the issues with any datacenter components, the behavior index of all the related hardware will gradually increase over a time period and vice versa.

In some embodiments, EAC 632 is can be deployed in datacenter 630 with appropriate access level control on a standalone system with any operating system (OS) platform based on application packaging. EAC 632 is registered to CDN server 640. Based on the location settings, EAC 632 intelligently identifies the local CDN server. Registration details can be built into EAC 632.

Once registered with CDN server 640, EAC 632 is enabled to participate in a support process. As mentioned, EAC 632 has the inventory of devices and applications within the datacenter and monitor alerts based on set policies, that are stored in a database associated with EAC 632. EAC 632 has built-in logic to perform different types of probability calculations via Poisson distribution, and then use the combination of PMF and CDF to produce health and behavior indices for the devices.

EAC 632 performs a monitoring operation over several parameters of the datacenter 630 lab (as mentioned above) to make a decision to increase or decrease the behavior index of the hardware. EAC 632 may also have a logging mechanism for different errors that occur and are captured in datacenter 630. The application log is also sent to backend server 650, via CDN server 640, along with the device and application inventory data. The data is used by backend server 650 to update the mean failure co-efficient value ($\lambda$) and the respective monitoring policies. In some embodiments, communication between EAC 632 and CDN server 640 occurs on a secure channel using encryption and a unique registered identifier for each EAC.

As the number of devices and applications being monitored will be very high, supporting monitoring on all those devices/services/applications from one central backend server is challenging. CDN parsers, e.g., CDN parser 646, are therefore deployed based on priorities in different regions, continents and countries. CDN parser 646 provides registration support to all the EAC clients, e.g., EAC 632, in the region and sends the registration details to backend server 650. Based on the data provided by the CDN parsers, e.g., CDN parser 646, backend server 650 identifies each EAC client and performs smart analysis on the input data (e.g., periodic task logs, etc.). CDN parser 646 functions as a first point of contact for EAC 632 and provides one or more interfaces for EAC 632 to communicate with backend server 650. CDN parser 646 also collects the periodic logs and device/application inventory from EAC 632 and uploads the data to backend server 650. Further, CDN parser 646 may store different failure co-efficient values (A) for different hardware and pass these values to EAC clients on request. CDN parser 646 also receives data from backend server 650 and updates policy definitions for devices/applications monitoring to EAC clients.

Backend server 650 is a centrally located service which monitors all support activities occurring in the ecosystem by using the CDN parsers. In some embodiments, backend server 650: (i) collects data from all the CDN parsers which are deployed in a geographically distributed manner; (ii) performs analysis of historic data to produce the mean failure co-efficient value (λ) for different sets of hardware and the respective policies based on a threshold and a frequency of occurrences of failures and alerts; (iii) maintains a database that contains details of all the CDNs and EACs in the field. This data is utilized to perform intelligent analysis of failures and understand patterns/trends of failures in different families and versions of hardware and applications; (iv) accepts upload of several types of logs and performs predictive analysis on the data; and (v) updates the logic of support transactions and any threat perceptions to CDNs and EACs.

Figure 10:
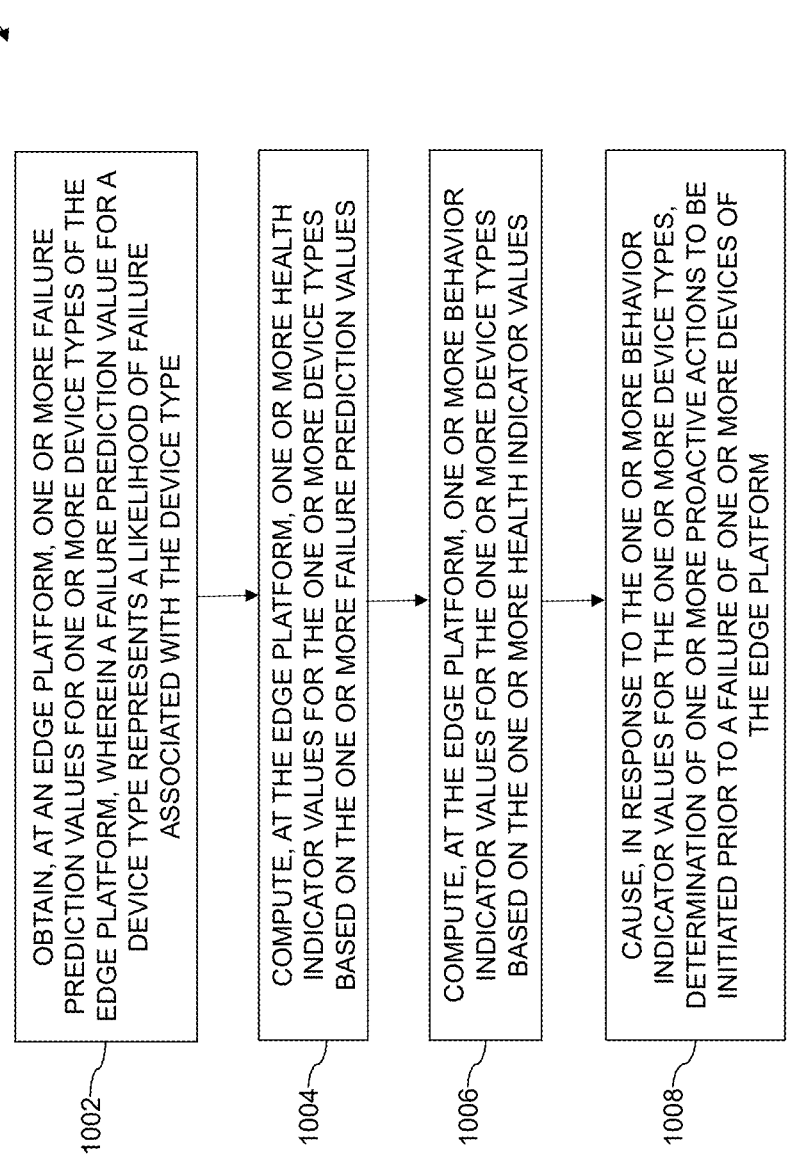
FIG. 10 depicts a process for hardware management in a multi-tiered architecture according to an illustrative embodiment.

The operation of the information processing systems 100 and 500 and multi-tiered architecture 600 will now be described in further detail with reference to the flow diagram of FIG. 10. With reference to FIG. 10, a process 1000 for hardware management in a multi-tiered architecture as shown includes steps 1002 through 1008, and is suitable for use in the system 100 and/or 500 and multi-tiered architecture 600 but is more generally applicable to other types of information processing systems configured for hardware management in a multi-tiered architecture.

Step 1002 obtains, at an edge platform, one or more failure prediction values for one or more device types of the edge platform, wherein a failure prediction value (e.g., mean failure coefficient value λ) for a device type represents a likelihood of failure associated with the device type.

Step 1004 computes, at the edge platform, one or more health indicator (e.g., health index) values for the one or more device types based on the one or more failure prediction values.

Step 1006 computes, at the edge platform, one or more behavior indicator (e.g., behavior index) values for the one or more device types based on the one or more health indicator values.

Step 1008 causes, in response to the one or more behavior indicator values for the one or more device types, determination of one or more proactive actions (e.g., update and/or upgrade hardware resources) to be initiated prior to a failure of one or more devices of the edge platform.

In some embodiments, the one or more health indicator values are computed using one or more probability distribution functions.

In some embodiments, the one or more probability distribution functions comprise a probability mass function.

In some embodiments, the one or more probability distribution functions further comprise a cumulative distribution function.

In some embodiments, a health indicator value for a device type is computed via a logical addition (e.g., AND operation) of a computation result of the probability mass function and a computation result of the cumulative distribution function.

In some embodiments, at least one of the one or more probability distribution functions comprises a Poisson distribution function.

In some embodiments, the one or more failure prediction values comprise mean coefficient values representative of respective failure predictions for the one or more device types.

In some embodiments, the process recomputes, at the edge platform, the one or more behavior indicator values based on a set of monitored parameters of one or more devices of the edge platform.

In some embodiments, the process sends, from the edge platform to a centralized backend device from which the one or more failure prediction values originate, at least a portion of the set of monitored parameters to enable the centralized backend device to update at least a portion of the one or more failure prediction values.

In some embodiments, the set of monitored parameters are received at the edge platform as part of a monitoring policy from the centralized backend device.

In some embodiments, the process initiates a registration, by the edge platform, with a content delivery network device in a network of distributed content delivery network devices that are connected to a centralized backend device from which the one or more failure prediction values originate.

In some embodiments, the steps of the process are executed by an edge analyzer client (e.g., EAC) installed at the edge platform.

It is to be appreciated that the FIG. 10 process and other features and functionality described above can be adapted for use with other types of information systems configured to perform hardware management in a multi-tiered architecture.

The particular processing operations and other system functionality described in conjunction with the flow diagram of FIG. 10 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 10 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems configured with hardware management capabilities at multiple tiers as disclosed herein can provide a number of significant advantages relative to conventional arrangements. For example, logic is implemented at edge client module and CDN server levels, thereby reducing bandwidth, compute and network resources used in connection with transmission of operational data for datacenter support processes.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing systems 100 and 500 and multi-tiered architecture 600 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the datacenter 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and datacenter in illustrative embodiments. These and other cloud-based systems in illustrative embodiments can include object stores.

Illustrative embodiments of processing platforms will now be described in greater detail with reference to FIGS. 11 and 12. Although described in the context of system 100 and/or 500 and multi-tiered architecture 600, these platforms may also be used to implement at least portions of other information processing systems in other embodiments.

Figure 11:
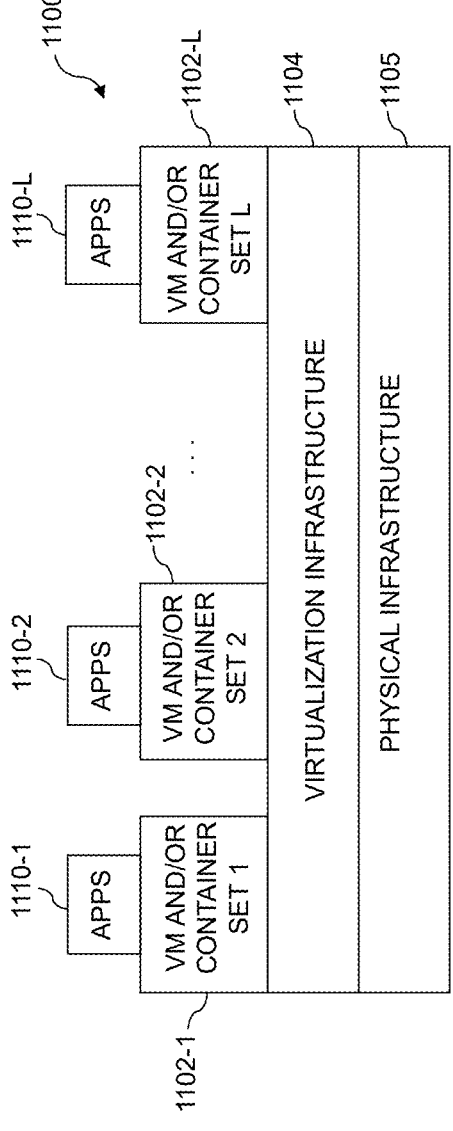
FIGS. 11 and 12 depict examples of processing platforms that may be utilized to implement at least a portion of an information processing system according to illustrative embodiments.
Figure 12:
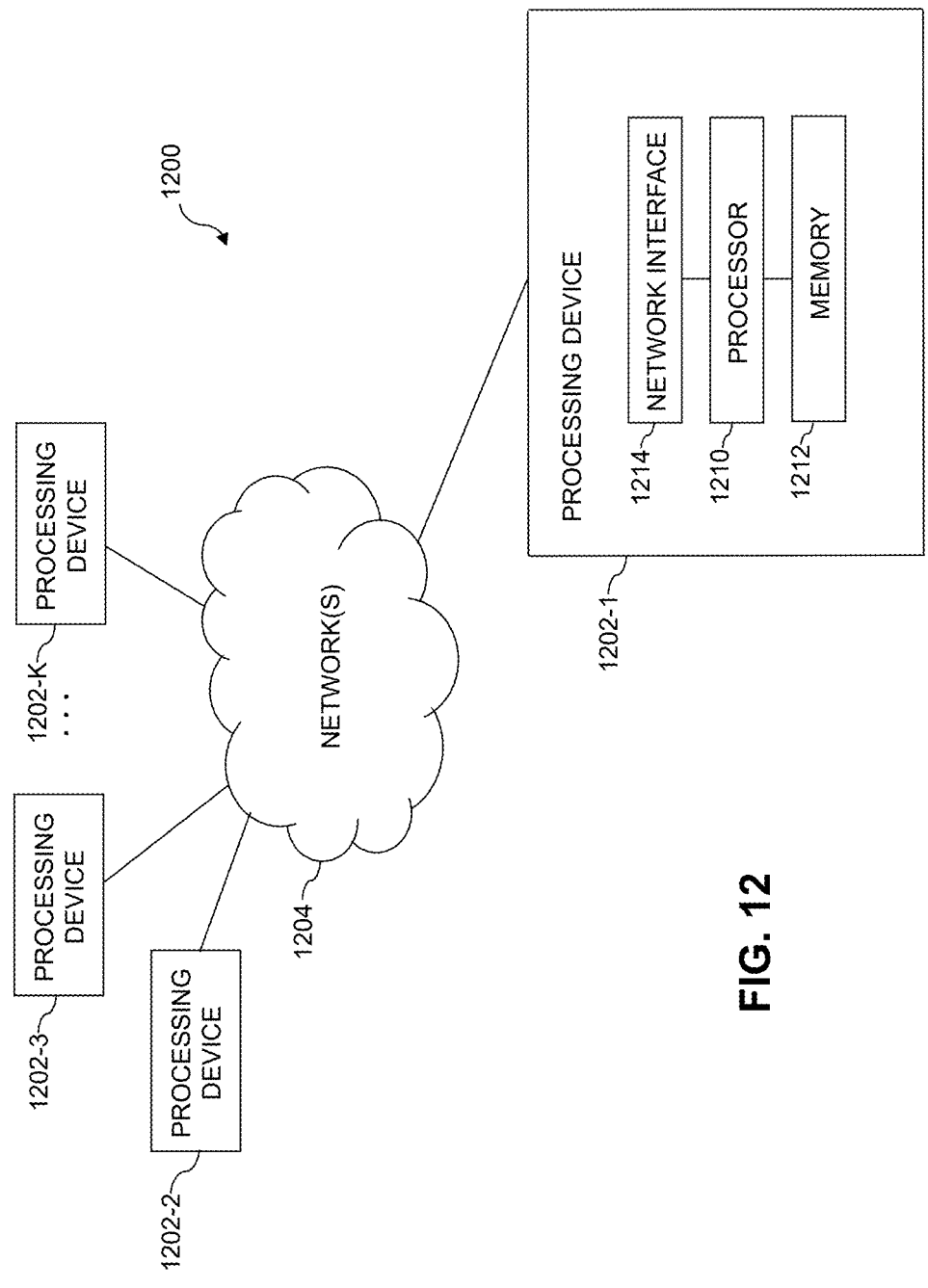

FIG. 11 shows an example processing platform comprising cloud infrastructure 1100. The cloud infrastructure 1100 comprises a combination of physical and virtual processing resources that may be utilized to implement at least a portion of the information processing system 100. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. A hypervisor platform may be used to implement a hypervisor within the virtualization infrastructure 1104, where the hypervisor platform has an associated virtual infrastructure management system. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 and/or 500 and multi-tiered architecture 600 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212. The processor 1210 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 and/or 500 and multi-tiered architecture 600 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the system 100 and/or 500 and multi-tiered architecture 600 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and datacenters. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:

obtaining, at an edge platform, one or more failure prediction values for one or more device types of the edge platform, wherein a failure prediction value for a device type represents a likelihood of failure associated with the device type;

computing, at the edge platform, one or more health indicator values for the one or more device types based on the one or more failure prediction values;

computing, at the edge platform, one or more behavior indicator values for the one or more device types based on the one or more health indicator values;

causing, in response to the one or more behavior indicator values for the one or more device types, one or more proactive actions to be initiated prior to a failure of one or more devices of the edge platform, wherein the one or more proactive actions comprise one of updating and upgrading one or more hardware resources of the one or more devices;

recomputing, at the edge platform, the one or more behavior indicator values based on a set of monitored parameters of one or more devices of the edge platform; and sending, from the edge platform to a centralized backend device from which the one or more failure prediction values originate, at least a portion of the set of monitored parameters to enable the centralized backend device to update at least a portion of the one or more failure prediction values;

wherein the set of monitored parameters are received at the edge platform as part of a monitoring policy from the centralized backend device; and wherein the obtaining, computing, causing, recomputing and sending steps are executed by a processing device operatively coupled to a memory.

2. The method of claim 1 wherein the one or more health indicator values are computed using one or more probability distribution functions.

3. The method of claim 2 wherein the one or more probability distribution functions comprise a probability mass function.

4. The method of claim 3 wherein the one or more probability distribution functions further comprise a cumulative distribution function.

5. The method of claim 4 wherein a health indicator value for a device type is computed via a logical addition of a computation result of the probability mass function and a computation result of the cumulative distribution function.

6. The method of claim 2 wherein at least one of the one or more probability distribution functions comprises a Poisson distribution function.

7. The method of claim 1 wherein the one or more failure prediction values comprise mean coefficient values representative of respective failure predictions for the one or more device types.

8. The method of claim 1 further comprises initiating a registration, by the edge platform, with a content delivery network device in a network of distributed content delivery network devices that are connected to a centralized backend device from which the one or more failure prediction values originate.

9. The method of claim 1 wherein the steps of the method are executed by an edge analyzer client installed at the edge platform.

10. An apparatus comprising:

a processing device operatively coupled to a memory and configured:

to obtain, at an edge platform, one or more failure prediction values for one or more device types of the edge platform, wherein a failure prediction value for a device type represents a likelihood of failure associated with the device type;

to compute, at the edge platform, one or more health indicator values for the one or more device types based on the one or more failure prediction values;

to compute, at the edge platform, one or more behavior indicator values for the one or more device types based on the one or more health indicator values;

to cause, in response to the one or more behavior indicator values for the one or more device types, one or more proactive actions to be initiated prior to a failure of one or more devices of the edge platform, wherein the one or more proactive actions comprise one of updating and upgrading one or more hardware resources of the one or more devices;

to recompute, at the edge platform, the one or more behavior indicator values based on a set of monitored parameters of one or more devices of the edge platform and to send, from the edge platform to a centralized backend device from which the one or more failure prediction values originate, at least a portion of the set of monitored parameters to enable the centralized backend device to update at least a portion of the one or more failure prediction values;

wherein the set of monitored parameters are received at the edge platform as part of a monitoring policy from the centralized backend device.

11. The apparatus of claim 10 wherein the one or more health indicator values are computed using one or more probability distribution functions.

12. The apparatus of claim 11 wherein the one or more probability distribution functions comprise a probability mass function.

13. The apparatus of claim 12 wherein the one or more probability distribution functions further comprise a cumulative distribution function.

14. The apparatus of claim 13 wherein a health indicator value for a device type is computed via a logical addition of a computation result of the probability mass function and a computation result of the cumulative distribution function.

15. The apparatus of claim 11 wherein at least one of the one or more probability distribution functions comprises a Poisson distribution function.

16. An article of manufacture comprising a non-transitory processor-readable storage medium having stored therein program code of one or more software programs, wherein the program code when executed by at least one processing device causes said at least one processing device to perform steps of:

obtaining, at an edge platform, one or more failure prediction values for one or more device types of the edge platform, wherein a failure prediction value for a device type represents a likelihood of failure associated with the device type;

computing, at the edge platform, one or more health indicator values for the one or more device types based on the one or more failure prediction values;

computing, at the edge platform, one or more behavior indicator values for the one or more device types based on the one or more health indicator values;

causing, in response to the one or more behavior indicator values for the one or more device types, one or more proactive actions to be initiated prior to a failure of one or more devices of the edge platform, wherein the one or more proactive actions comprise one of updating and upgrading one or more hardware resources of the one or more devices;

recomputing, at the edge platform, the one or more behavior indicator values based on a set of monitored parameters of one or more devices of the edge platform; and sending, from the edge platform to a centralized backend device from which the one or more failure prediction values originate, at least a portion of the set of monitored parameters to enable the centralized backend device to update at least a portion of the one or more failure prediction values;

wherein the set of monitored parameters are received at the edge platform as part of a monitoring policy from the centralized backend device.

17. The article of manufacture of claim 16 wherein the one or more health indicator values are computed using one or more probability distribution functions.

18. The article of manufacture of claim 17 wherein the one or more probability distribution functions comprise a probability mass function.

19. The article of manufacture of claim 18 wherein the one or more probability distribution functions further comprise a cumulative distribution function.

20. The article of manufacture of claim 19 wherein a health indicator value for a device type is computed via a logical addition of a computation result of the probability mass function and a computation result of the cumulative distribution function.

* * * * *